United States Patent [19]
Schmalzel

[11] Patent Number: 5,687,609
[45] Date of Patent: Nov. 18, 1997

[54] METHOD AND APPARATUS FOR MINERAL FLOTATION CELL LEVEL DETECTION

[75] Inventor: Michael O. Schmalzel, Tucson, Ariz.

[73] Assignee: Cyprus Amax Minerals Company, Englewood, Colo.

[21] Appl. No.: 539,344

[22] Filed: Oct. 5, 1995

[51] Int. Cl.$^6$ ..................................... G01F 23/00
[52] U.S. Cl. ............................... 73/322.5; 73/305
[58] Field of Search ........................ 73/305, 309, 314, 73/322.5

[56] References Cited

U.S. PATENT DOCUMENTS

| | | |
|---|---|---|
| 4,101,174 | 7/1978 | Miller ........................... 73/322.5 |
| 4,215,574 | 8/1980 | Godeux ......................... 73/322.5 |
| 4,875,370 | 10/1989 | Spitzer ............................ 73/314 |
| 4,876,888 | 10/1989 | Ricketts et al. ............... 73/322.5 |
| 5,073,253 | 12/1991 | Bishop et al. .................. 73/309 |
| 5,319,973 | 6/1994 | Crayton et al. ................ 73/322.5 |

*Primary Examiner*—Ronald L. Biegel
*Attorney, Agent, or Firm*—Bruce E. Dahl

[57] ABSTRACT

A flotation cell level detector for providing an indication of a level of a liquid in a flotation cell may comprise a generally circular shaped float having a submergence function such that small changes in the submergence level of the float will result in large changes in the submerged volume of the float when the float is submerged at about the design level of submergence. A reference member is attached to the float and held a spaced distance above the float by a plurality of support members. A sensor mounted above the reference member detects the position of the reference member and generates a corresponding output signal.

15 Claims, 6 Drawing Sheets

METHOD AND APPARATUS FOR MINERAL FLOTATION CELL LEVEL DETECTION

FIELD OF INVENTION

This invention relates to mineral concentration by froth flotation and more specifically to an improved method and apparatus for detecting the level of an aerated slurry in a froth flotation cell.

BACKGROUND

Froth flotation is a well-known process for concentrating solid minerals in a relatively finely divided state by separating hydrophobic particles from hydrophilic particles. The finely divided state of the mineral-bearing ore is typically made possible by a comminution step, preceding the froth flotation process, wherein the mineral-bearing ore is ground in a wet environment (e.g., with water) to render the valuable mineral components within the ore substantially liberated from the host gangue, and thereby providing to the flotation process a water-ore pulp or slurry consisting of largely discrete particles of valuable mineral (usually sulphide minerals) and host gangue (usually mineral oxides). The water-ore pulp or slurry is then treated with a reagent to render the surface of the valuable mineral hydrophobic (i.e., water repellant) while leaving the host gangue hydrophilic (i.e., water loving or wettable). The hydrophobic valuable mineral is then separated from the host gangue in a flotation cell.

The reagents or collectors which make the sulphide minerals hydrophobic almost always consist of hetropolar molecules, each of which has a polar or charged end and a non-polar or hydrocarbon end. The polar ends of these molecules tend to attach to the surfaces of the mineral particles, which themselves are polar, leaving the non-polar hydrocarbon ends extending outward. It is this orientation which instills the hydrophobic character to the valuable mineral particles. Commonly used sulphide reagents or collectors are the potassium and sodium xanthates, although other reagents may be used, such as, for example, the thionocarbamates, dithiophosphates, and thiocarbanilides.

A typical flotation cell may comprise a tank for holding an amount of the chemically treated mineral slurry, a inlet port for feed slurry, a discharge port, an overflow lip, and an agitator/diffuser assembly. The agitator/diffuser assembly continuously agitates the slurry to keep the ground ore particles suspended and to prevent them from settling to the bottom of the tank. Air introduced into the slurry by an aerator forms a dispersed stream of air bubbles which attract the hydrophobic valuable minerals and carry them upward to the top of the flotation cell, whereupon they form a froth. The froth serves two purposes. First, it prevents the bubbles from bursting which would allow the hydrophobic valuable mineral to fall back into the slurry. Second, the froth provides a convenient means to carry the valuable minerals over the overflow lip of the cell. The overflowing froth, commonly called concentrate, is then gathered in a network of troughs or launders adjacent the flotation cell. The discharge port of the flotation cell is located near the bottom of the tank and is used to remove the non-floating, hydrophilic host gangue, commonly called tailing. The discharge port can usually be throttled to vary the discharge rate of the tailing.

Since the mineral concentrate is drawn off as a froth floating on top of the slurry, accurate control of the slurry level is required for efficient operation of the froth flotation cell. For example, if the level of the aerated slurry is too high, a portion of the feed slurry may flow over the flotation cell lip along with the concentrate, thus contaminating the concentrate with host gangue, and potentially overloading the downstream concentrate handling processes. Conversely, if the level of the aerated slurry is too low, less concentrate will be recovered from the slurry. In the extreme case, no concentrate will be recovered and all of the valuable mineral particles will report to the tailing. In any event, aerated slurry levels that are either too high or too low represent increased processing cost, reduced revenues, or both.

A typical cell level control system for maintaining the level of the aerated slurry at an optimum position may comprise a level detector for sensing the level of the aerated slurry, a controller, and an actuator to control or throttle the discharge port and/or inlet feed rate to maintain the aerated slurry at the proper level. Level detectors that are currently being used to detect the level of the aerated slurry include resistive probes, single bubble tubes, dual bubble tubes, capacitance probes, various kinds of floats, and ultrasonic probes for directly measuring the level of the aerated slurry or for measuring the level of de-aerated slurry contained within a stilling well that is partially submerged with the flotation cell.

While level detectors of the kind identified above are used to determine the level of the aerated slurry, none is without its problems. For example, density variations in the aerated slurry, due either to changes in solids concentration or aeration rates, can produce significant measurement discrepancies in some of the devices, while changing froth character, e.g., froth height, froth density, or froth conductivity, impact other devices. The build-up of solids on the detection devices can also affect measurement accuracy. The ability of such currently used level detectors to accurately sense small changes in the slurry level is also marginal, making it difficult to control the slurry level within a sufficiently narrow range to achieve maximum recovery.

Consequently, the need remains for a slurry level detector that can accurately measure the level of the slurry, but without being significantly affected by changes in slurry or froth density, conductivity or electrical capacitance, or by changes in froth height or other changes in the character of the froth. Such a slurry level detector should also be relatively free from the effects of solids build-up. Significant advantages could be realized if such a level detector could sense small changes in the slurry level. The ability to detect such small changes would allow the slurry level to be maintained within relatively narrow range, thus maximizing recovery. Additional advantages could be realized if the level detector were durable and could be easily removed for cleaning or replacement.

SUMMARY OF THE INVENTION

A flotation cell level detector for providing an indication of a level of a liquid in a flotation cell may comprise a generally circular shaped float having a submergence function such that small changes in the submergence level of the float will result in large changes in the submerged volume of the float when the float is submerged at about the design level of submergence. A reference member is attached to the float and held a spaced distance above the float by a plurality of support members. A sensor mounted above the reference member detects the position of the reference member and generates a corresponding output signal.

Automatic control of the liquid level within the tank may be accomplished by connecting to the cell level detector a throttle valve control apparatus that is responsive to the output signal from the position sensor. The throttle valve control apparatus selectively opens and closes a throttle valve assembly mounted to the tank to maintain the level of the liquid in the tank between a minimum level and a maximum level.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
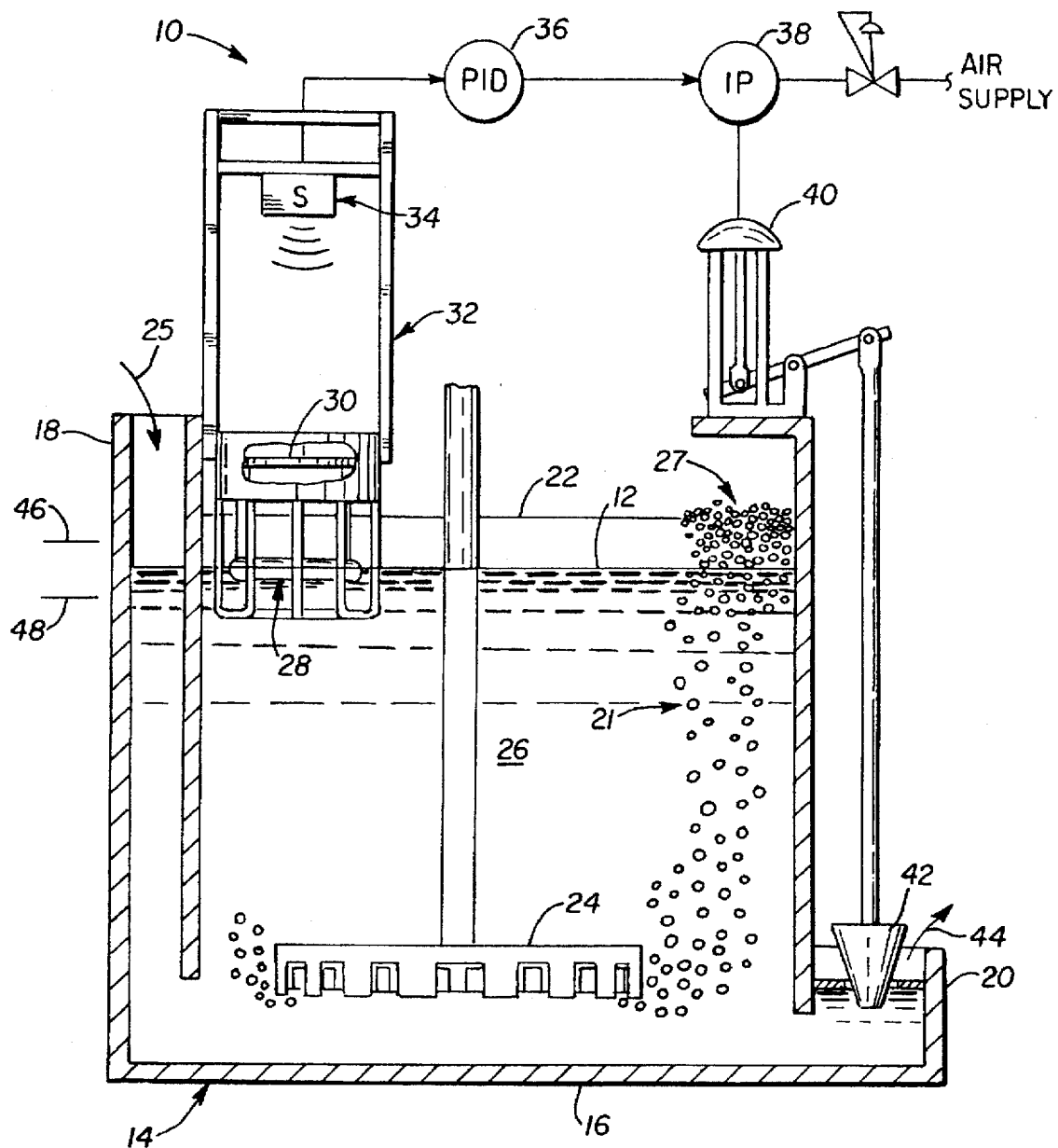
FIG. 1 is a side view in elevation showing the flotation cell level detector and control apparatus as it could be used to detect the level of an aerated slurry contained within a froth flotation cell.

The flotation cell level detector and control assembly 10 according to the present invention is shown in FIG. 1 as it could be used to detect and control the slurry level 12 in a froth flotation cell assembly 14 of the kind typically used to concentrate copper sulphide minerals. The froth flotation cell assembly 14 may comprise a cell or tank 16 having an integral feed inlet 18 through which is introduced a slurry 25 that contains the copper sulphide minerals to be concentrated, a throttleable tailing outlet 20, and an overflow lip 22. Flotation cell assembly 14 may also include an agitator/diffuser 24 for introducing a gas, such as air (not shown), into the slurry 25. The agitator/diffuser 24 agitates the slurry and disperses the gas into small bubbles 21 which form an aerated slurry 26 and a froth 27.

Figure 2:
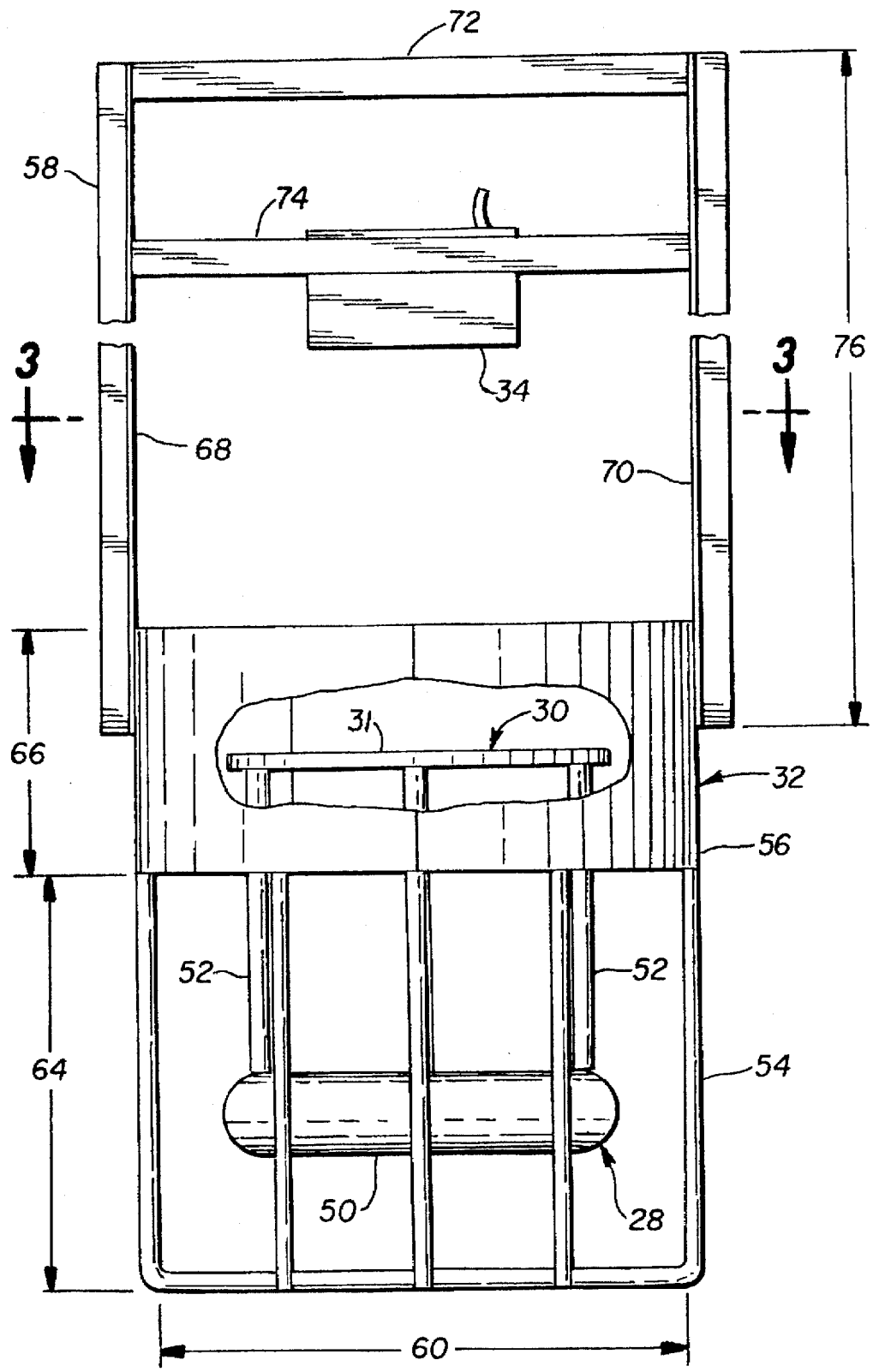
FIG. 2 is a side view in elevation of the float cage assembly showing the position of the float assembly contained therein.

Referring now to FIGS. 1 and 2 simultaneously, the flotation cell level detector and control assembly 10 may comprise a float assembly 28 having a reference member 30 attached thereto, a float retainer or cage assembly 32, and a sensor assembly 34. A proportional-integral-derivative (PID) electronic controller assembly 36 along with a current to pressure (IP) transducer 38 and instrument grade air supply are used to control a dart actuator 40, which raises and lowers a needle valve or dart 42 in the tailing outlet 20 to control the discharge rate of the tailing 44, thus the level 12 of the slurry 26 within tank 16.

Figure 4:
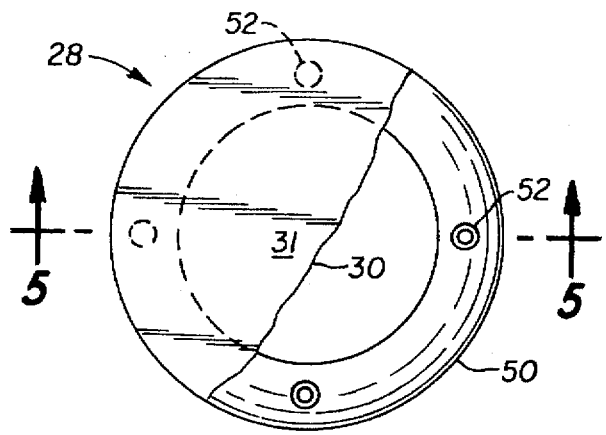
FIG. 4 is a plan view of the float assembly with a portion of the reference member broken away to show the details of the toroidal float and support members.
Figure 5:
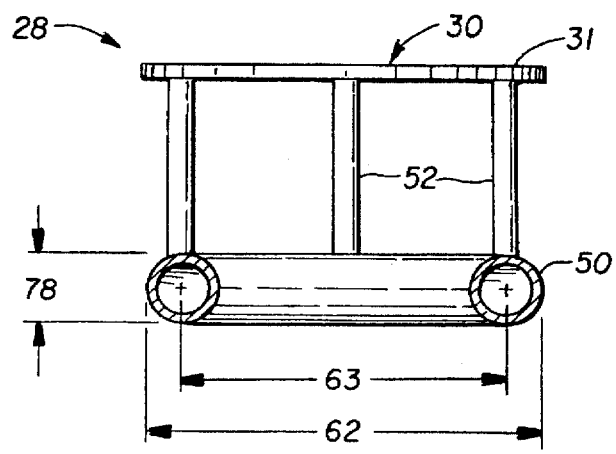
FIG. 5 is a sectional view in elevation of the float assembly taken along the line 5—5 of FIG. 4.

The float assembly 28 is best seen in FIGS. 4 and 5 and comprises a generally toroidal shaped float 50 to which is attached a plurality of elongate support members 52 for supporting the reference member 30 at a position above the highest expected level of the froth 27 (FIG. 1). As will be explained in greater detail below, the float assembly 28 has an effective float density that is equal to the sum of the mass of the float 50, support members 52, and reference member 30 divided by the volume of the float 50. The effective float density of the float assembly 28 is such that it is less than a lowest expected density of the aerated slurry 26 and greater than a highest expected density of the froth 27. The float 50 is also designed so that when it is submerged at its design depth, large changes in submerged volume will occur with very small changes in submerged depth. This design feature minimizes float height changes due to variations in slurry density.

The froth flotation process may be carried out in a conventional manner as follows, with the notable exception that control of the slurry level 12 is accomplished with the flotation cell level detector and control assembly 10 according to the present invention. The froth flotation process is initiated by filling the tank 16 with a slurry 25 via feed inlet 18. The slurry 25 may comprise a mixture of the mineral value to be concentrated, the host gangue, along with a suitable liquid carrier, such as water, and the various chemical reagents required to render the valuable mineral hydrophobic. The tank 16 is filled with slurry 25 until the slurry level 12 is within a control bounds defined by some maximum level 46 and some minimum level 48. The dart 42 is then raised and lowered as necessary so that the outflow of tailing 44 through the tailing outlet 20 is sufficient to maintain the slurry level 12 within the control bounds. Air introduced into the slurry 25 via the agitator/diffuser 24 forms a plurality of bubbles 21, creating an aerated slurry 26 and a froth 27. The froth 27, being of a lower density then the aerated slurry 26, forms on and above the slurry level 12 and contains a much higher concentration of the valuable mineral than the aerated slurry 26. As the process continues, the froth 27 builds-up to the point where it flows over the overflow lip 22, whereupon it is collected by a suitable collection apparatus, such as a launder (not shown), for subsequent processing.

As was mentioned above, accurate control of the slurry level 12 ensures optimum mineral recovery in a froth flotation process, such as the process described above. In the present invention, the slurry level 12 is sensed and controlled by the flotation cell level detector and control assembly 10. The float assembly 28 contained within the float cage assembly 32 is free to rise and fall with changes in the slurry level 12. Changes in the slurry level 12 are detected by the float assembly 28 and sensor assembly 34, which senses the relative position of the reference member 30 with respect to the sensor assembly 34. Since the reference member 30 is attached to the float 50, measurement of the position of the reference member 30 provides an indication of the position of the slurry level 12. The electronic proportional-integral-derivative (PID) controller assembly 36 monitors an output signal from the sensor assembly 34 and generates an output signal based on the instantaneous position of the float assembly 28 or the various time derivatives thereof, as may be required to achieve a desired system response. The output signal from the PID controller assembly 36 activates the current to pressure (IP) transducer 38 which in turn actuates the dart actuator 40 as necessary to raise or lower the dart 42, thus control the discharge rate of the tailing 44. Of course, changes in the discharge rate of the tailing 44 have the effect of raising or lowering the slurry level 12 for a given constant input feed rate of slurry 25.

A significant advantage of the flotation cell level detector and control apparatus 10 according to the present invention is that it allows for the accurate detection of small changes in the slurry level 12 regardless of expected changes in slurry density. Slurry level detection is also unaffected by variations in froth thickness and density, and is independent of changes in the electrical conductivity of the aerated slurry or the froth. Consequently, the flotation cell level detector and control apparatus 10 allows for accurate slurry level sensing and control under a wide range of conditions.

The increased detection accuracy of the present invention is due in large part to the design and configuration of the float assembly 28. More specifically, float assembly 28 utilizes float 50 that, when operated at its design depth, experiences large changes in submerged volume with only small changes in submerged depth. This feature minimizes float height changes due to variations in slurry density. In one embodiment, the float 50 comprises a toroid, although other configurations may also be used, as will be described below.

Still other advantages are associated with the float 50. For example, in one embodiment, the toroidal shape of the float 50 minimizes the tendency of solids (not shown) to deposit upon, or air bubbles 21 to collect below, the float 50, either of which can affect slurry level detection accuracy. The toroidal shape of the float 50 also tends to minimize the chances that the float assembly 28 will be significantly disturbed by waves (not shown) on the surface of the aerated slurry 26 or by movement of the froth 27. The float assembly 28 is also inexpensive, durable, and can be easily removed from the float cage assembly 32 for cleaning or replacement.

Another advantage of the flotation cell level detector and control apparatus 10 is that the reference member 30 is maintained at a position above the highest expected level of the froth 27, thus reducing the possibility that solids from the froth 27 will accumulate on the reference member 30. The elevated position reference member 30 also allows a wide variety of non-contact position sensors to be used to sense the position of the reference member 30. Besides being convenient, the ability to utilize non-contact position sensors also dispenses with the need to physically attach position sensors directly to the float assembly 28, which may subject them to exposure to the froth.

Having generally described the flotation cell level detector and control apparatus 10, as well as some of its significant features and advantages, the flotation cell level detector and control apparatus 10 will now be described in detail. As was mentioned above, the flotation cell level detector and control apparatus 10 is shown in FIG. 1 as it could be used to detect and control the slurry level 12 in a froth flotation cell assembly 14 of the kind typically used to concentrate copper sulphide ore. It should be noted, however, that such flotation cells are not limited to use in such copper beneficiation processes, and are also commonly used in a wide range of other industrial applications. Consequently, the flotation cell level detector and control apparatus 10 according to the present invention should not be regarded as limited to any one particular froth flotation process.

Still referring to FIG. 1, the froth flotation cell assembly 14 may comprise a tank 16 having feed inlet 18 through which a slurry 25 is introduced, a throttleable tailing outlet 20, an overflow lip 22, and an agitator/diffuser assembly 24.

If the froth flotation cell assembly 14 is used for the concentration of copper sulphide ore, the slurry 25 will usually comprise a mixture of finely ground, liberated, copper sulphide mineral particles, host gangue particles, water, and potassium amyl xanthate. The potassium amyl xanthate makes the copper sulphide hydrophobic, while leaving the host gangue oxide minerals largely hydrophilic. A gas, such as air (not shown) is introduced into the slurry 25 by the agitator/diffuser assembly 24, which disperses the gas into small bubbles 21 and creates an aerated slurry 26. As the bubbles 21 float upward toward the surface of aerated slurry 26, they collect and carry the conditioned hydrophobic copper mineral particles (not shown) to surface of the aerated slurry 26, whereupon they form a froth 27 which contains relatively high concentrations of the conditioned copper solids. Continued aeration of the slurry 26 causes the froth 27 to build-up to the point where it overflows the lip 22 of tank 16.

The location of the slurry level 12 with respect to the overflow lip 22 is critical in maximizing the recovery of the valuable mineral and is sensed and controlled by the flotation cell level detector and control apparatus 10. Essentially, the cell level detector and control apparatus 10 may comprise a float assembly 28 having a reference member 30 attached thereto, a float retainer or cage assembly 32, and a sensor assembly 34. An electronic proportional-integral-derivative (PID) controller assembly 36 and current to pressure (IP) transducer 38 are used to control a dart actuator 40, which raises and lowers a needle valve or dart 42 in the tailing outlet 20 to control the discharge rate of the tailing (arrow 44), thus the level 12 of the slurry 26 within tank 16.

Figure 3:
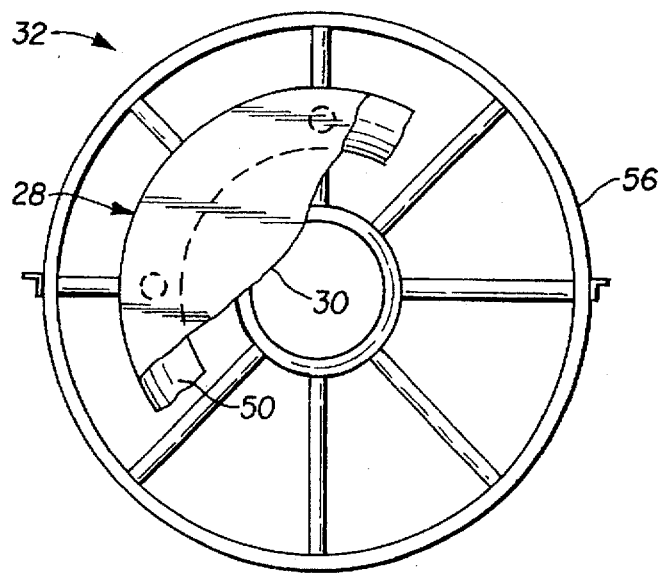
FIG. 3 is a plan view of the float cage assembly taken along the line 3—3 of FIG. 2 with a portion of the float assembly broken away to more clearly show the details of the bottom structure of the float cage assembly.

The float cage assembly 32 is best seen in FIGS. 2 and 3 and comprises a circular cage portion 54, an optional reference member shield portion 56, and an upper frame portion 58. The circular cage portion 54 is generally in the shape of a cylinder, having length 64 and an inside diameter 60 that is greater than the outside diameter 62 (FIG. 5) of float assembly 28. While the inside diameter 60 and length 64 of circular cage portion 54 are not particularly critical, the inside diameter 60 should be large enough to easily accommodate the float assembly 28 without the danger that the float assembly 28 will bind on the cage assembly 32 as the float assembly 28 rises and falls with variations in the slurry level 12. On the other hand, the inside diameter 60 should not be so large that the float assembly 28 can drift out from under the zone of detection (not shown) of the sensor assembly 34. In one preferred embodiment, the inside diameter 60 of circular cage portion 54 is about 49.5 cm (19.5 inches) and the outside diameter 62 of the float 50 is about 42 cm (16.5 inches). Similarly, the circular cage portion 54 should be sufficiently long so that it will extend between at least the lowest average slurry run level and the cell lip plus the height of the float assembly. It should be understood that the minimum level 48 and the maximum level 46 (FIG. 1) are the control bounds for the slurry for a given ore type. If other ore types are to be used, or if plant operating targets are changed, then the control bounds defined by the maximum and minimum levels 46 and 48 may change. In any event, then, the circular cage portion 54 should positioned so that when the float 50 is resting on the floor of the cage portion, the top 31 of reference member 30 is at least 3 cm (1.2 inches) above the overflow lip 22, higher if the flowability of the froth 27 is poor to prevent deposition of froth 27 on the top 31 of reference member 30. Preferably, the circular cage portion 54 should extend above the overflow lip 22, as best seen in FIG. 1. In one preferred embodiment, the length 64 is about 19 cm (7.5 inches). The lower cage portion 54 may be made of any of a wide variety of materials capable of withstanding continuous exposure to the aerated slurry 26 and froth 27. In one preferred embodiment, the circular cage portion 54 is made from 6.4 mm (¼-inch) diameter stainless steel rod welded together to form the circular cage portion 54 substantially as shown in FIGS. 2 and 3. Further, the length 64 of circular cage portion 54 and the vertical position of the cage portion 54 within the flotation tank 14, while not critical, should prevent the loss of the float assembly 28 into the flotation tank 14 when the slurry level 12 is below the operating level, such as when the cell 14 is being filled or emptied. Such an arrangement will also allow the float assembly 28 to be free to respond to changes in the slurry level 12 while the flotation cell 16 is in operation and will prevent unnecessary accumulation of froth 27 on the top 30 of reference member 31 during filling of tank 14 with slurry 26 at start-up. The cage 54 dispenses with the need to use close-tolerance guides to hold the float assembly 28 beneath the position sensor 34, thus avoiding the potential for deleterious solids build-up upon these guides, or corrosion or abrasion thereof, which may hamper the free movement of the float assembly 28.

The optional reference member shield portion 56 may comprise a substantially cylindrical member and is secured to the lower cage portion 54 by any convenient means, such as by welding. As its name implies, the reference member shield portion 56 shields the reference member 30 from froth splash and physical damage. In one embodiment, the reference member shield portion 56 has the same diameter as the diameter 60 of the lower cage portion and has a length 66 of about 21.6 cm (8.5 inches), which is sufficient to effectively shield the reference member 30 throughout its entire expected range of travel. As was the case for the circular cage portion 54, the particular material comprising the shield portion 56 is not critical and need only be capable of providing the required degree of strength and rigidity while being able to withstand at least periodic exposure to froth splash. In one embodiment, the shield portion 56 comprises stainless steel. Alternatively, of course, the shield portion 56 may be omitted.

The upper frame 58 of float cage assembly 32 is attached to the shield portion 56 and comprises a pair of elongate support columns 68, 70 connected by a pair of cross members 72, 74, as best seen in FIG. 2. The cross members 72, 74 are adapted to support the sensor assembly 34. The overall length 76 of upper frame 58 should be sufficient to allow the sensor assembly 34 to be spaced far enough away from the top surface 31 of reference member 30 so as to allow accurate measurement of the position of the top surface 31 of reference member 30. This spacing is required since some sensors (e.g., ultrasonic sensors) that may comprise sensor assembly 34 require a "dead zone" wherein detection is not possible. In one preferred embodiment using an ultrasonic sensor assembly 34, the overall length 76 of the upper frame 58 is such that the distance between the sensor assembly 34 and the top surface 31 of reference member 30 is about 30.5 cm (12 inches) when the slurry level 12 is at the highest expected level (i.e., just below the overflow lip 22).

The support column 68 may be used to mount the float cage assembly 32 to the froth flotation cell assembly 14 (FIG. 1) by any convenient means, such as by bolting the support column 68 to the tank 16. The upper frame 58 may be made from any of a wide variety of materials, such as stainless steel, capable of providing a stable and rigid platform for the sensor assembly 34 and capable of withstanding at least periodic exposure to the froth 27 and aerated slurry 26.

The float assembly 28 is best seen in FIGS. 4 and 5 and comprises a float 50, a plurality of elongate support members 52, and a reference member 30. As was briefly described above, the overall size and configuration of the float 50 should be such that its effective float density is less than a lowest expected density of the aerated slurry 26 and greater than a highest expected density of the froth 27. As used herein, the effective float density is equal to the sum of the mass of the float 50, support members 52, and reference member 30 divided by the submergible volume of the float 50.

Figure 6:
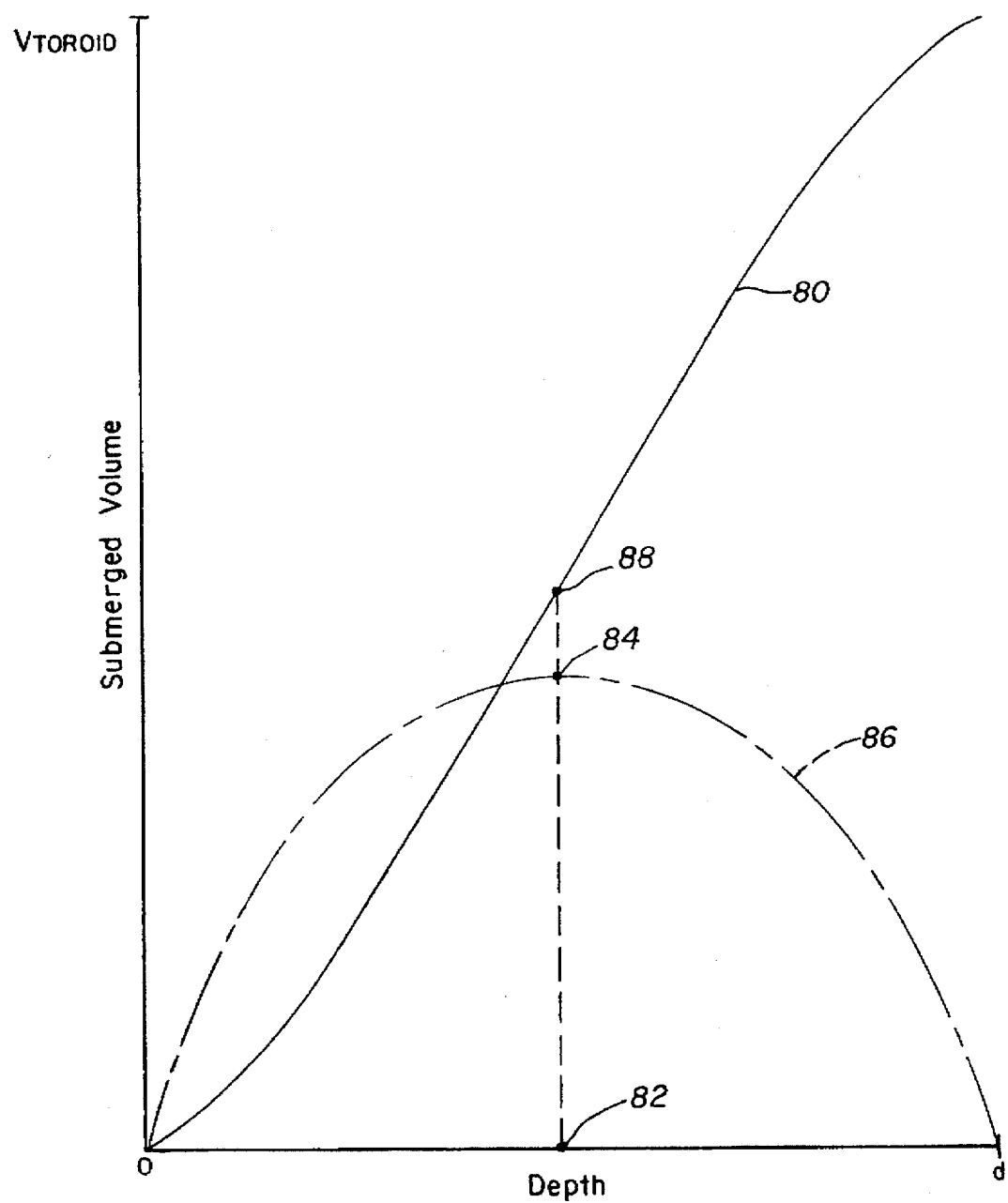
FIG. 6 is a plot of the submergence function (shown in solid) and its first derivative (shown in phantom) for a toroidal float of the type shown in FIGS. 4 and 5.

Referring now to FIG. 6, a significant design feature of the float 50 is that normal and expected variations in slurry density result in only very small changes in float height, typically well within the maximum allowable slurry level variation. This feature is a result of the submergence function 80 of the float assembly 28 in which large changes in submerged volume correspond to very small changes in submerged height, particularly at the design submergence level 82. This effect may be maximized if the design submergence level 82 corresponds to the maximum value 84 of the first derivative 86 of the submergence function 80. One shape having a submergence function similar to submergence function 80 is a toroid, i.e., an object having a surface generated by a closed curve rotating about, but not intersecting or containing, an axis in its own plane. Of course, other shapes could also be used, as will be described below.

If the float 50 is in the shape of a toroid, as shown in FIGS. 4 and 5, then the large diameter 63 and small diameter 78 of the float 50, as well as the weight of the materials comprising the float 50, support members 52, and reference member 30 must be such that the effective float density is less than a lowest expected density of the aerated slurry 26 and greater than a highest expected density of the froth 27. In order to provide good stability, the center of gravity of the overall float assembly 28 should be located at a point below the center of buoyancy, as would be well-known to persons having ordinary skill in the art. Disturbances to the float assembly 28 caused by waves on the surface of the aerated slurry can be minimized by making the large diameter 63 of the float 50 at least twice the height of the largest expected waves (not shown) on the surface of the aerated slurry 26. Finally, the length of the support members 52 should be such that the reference member 30 is located a distance above the center of the float 50 which is greater than the maximum predicted operating froth depth, i.e., the distance between the lowest expected slurry level 12 to the overflow lip 22. An iterative design process is usually required to optimize the overall design of the float assembly 28.

The first step in such an iterative design process is to determine the maximum density variation that is likely to occur in the aerated slurry 26. Then, the maximum acceptable variation in the slurry level 12 commensurate with good flotation performance is determined, which, of course, establishes the positions of the maximum and minimum levels 46 and 48 (FIG. 1), respectively, of the control bounds. The minimum and maximum float submergence levels $L_{min}$ and $L_{max}$ may be determined from the following equations:

$$L_{min} = \frac{\Delta}{\left(\frac{\rho_{max}}{\rho_{min}} - 1\right)} \quad (1)$$

-continued $$L_{max} = \frac{\Delta}{\left(1 - \frac{\rho_{min}}{\rho_{max}}\right)} \quad (2)$$

where $\rho_{min}$=the minimum expected aerated slurry density;
$\rho_{max}$=the maximum expected aerated slurry density; and
$\Delta$=the maximum allowable variation in the slurry level 14 (i.e., the difference between the maximum level 46 and the minimum level 48)

Once the minimum and maximum float submergence levels $L_{min}$ and $L_{max}$ have been determined, the effective float density ($\rho_{effective}$) can be determined, keeping in mind that the effective float density should be greater than the highest expected density of the froth 27 and less than the lowest expected density of the aerated slurry 26. Good results can be obtained if the effective float density is set to be equal to about one half of the average aerated slurry density (i.e., $\rho_{effective}=(\rho_{max}+\rho_{min})/2$).

After the effective float density is determined, an initial float geometry for providing a desired degree of submergence may be determined. As mentioned above, submergence fluctuations can be minimized if the float 50 is designed so that its design level of submergence 82 (FIG. 6) corresponds to the point 88 of maximum slope on the submergence function 80. That is, the design submergence level 82 should correspond to the maximum 84 of the first derivative 86 of the submergence function 80. For the toroid shown in FIGS. 4 and 5, that point corresponds to ½ of the small diameter 78 (d). That is, the float 50 will be about half submerged during normal operating conditions with average aerated slurry density. Such a submergence will result in the maximum change in submerged volume for a given small incremental change in submerged depth.

By way of example, the method and equations described above should yield the following design parameters for a toroidal float 50 for an aerated slurry and froth having the following characteristics:

$\rho_{max\ slurry}$=1.28 g/cm$^3$;
$\rho_{min\ slurry}$=0.82 g/cm$^3$; and
$\rho_{max\ froth}$=0.25 g/cm$^3$;
and, for the particular froth flotation cell assembly 14:
$\Delta$=1.27 cm; and
max. wave=18 cm
height Using Equations 1 and 2 above, the minimum and maximum float submergence levels $L_{min}$ and $L_{max}$ are calculated to be 2.26 cm (0.89 inch) and 3.53 cm (1.39 inches), respectively. Next, an effective float density is determined. A good starting point is to set the effective float density equal to about half of the average slurry density. In this example, the average slurry density is about 1.1 g/cm$^3$ (0.64 oz/in$^3$), which yields an initial effective float density $\rho_{effective}$ of about 0.5 g/cm$^3$ (0.29 oz/in$^3$).

The initial geometry of a toroidal float can now be calculated by first setting the large diameter 63 (FIG. 5) of the float 50 to about twice the maximum height of the surface waves (not shown). In one preferred embodiment, the maximum height of the surface waves is about 18 cm (7.1 inches), so the large diameter 63 is initially set at about 36 cm (14.2 inches). The small diameter 78 (FIG. 5) of the toroid may then be calculated using the well-known equation for calculating the volume of a toroid:

$$V_{toroid} = \pi^2 D (d/2)^2 \quad (3)$$

where:

D=the large diameter 63; and
d=the small diameter 78;

Of course, since the volume of the toroid $V_{toroid}$ is not yet known, the small diameter 78 (d) cannot yet be calculated. However, setting the volume of the toroid $V_{toroid}$ to be equal to the total estimated weight or mass M of the float assembly divided by the effective density $\rho_{effective}$ yields the following equation:

$$d = 2\sqrt{\frac{M}{\pi^2 D \rho_{effective}}} \quad (4)$$

Taking as an initial guess that the small diameter d (78 in FIG. 4) will be in the range of about 6 cm (2.4 inches) and assuming that the toroid will be made from ABS plastic having a wall thickness of about 0.4 cm (5/32 inches), the weight of the toroid is estimated to be about 1000 g (35.3 ounces). In one preferred embodiment, each support member 52 comprises a PVC plastic pipe having a length of about 23 cm (9 inches), an outside diameter of about 2.13 cm (0.84 inches), and a wall thickness of about 0.11 cm (0.045 inches). Therefore, the total weight of the support members 52 is estimated to be about 200 g (7 ounces). Similarly, the acrylic plate comprising reference member 30 in one embodiment has a thickness of about 0.238 cm (0.1 inch) and a diameter of about 38.6 cm (15.2 inches), which yields a total weight of about 300 g (10.6 ounces). Therefore, the total weight of the float assembly 28 is estimated to be about 1500 g (53 ounces). Using the 1500 g (53 ounce) weight estimate in Equation 4 yields a small diameter d of 5.8 cm (2.3 inches), which is about 96% of the initial estimated diameter of 6.0 cm (2.4 inches). Therefore, a float comprising a toroid having a large diameter 63 of about 36 cm (14.2 inches) and a small diameter 78 of about 6.0 cm (2.4 inches) will produce a float assembly 28 substantially meeting the criteria described above.

The geometry of the toroid can be double checked by calculating the submergence at the minimum and maximum slurry densities to ensure that it is within the maximum allowable slurry level variation ($\Delta$), determined above to be about 1.27 cm (0.5 inch). At the minimum slurry density, the submergence of the toroid is calculated in accordance with well-known principles to be about 2.8 cm (1.1 inches), while at the maximum slurry density, the submergence is about 2.3 cm (0.9 inch). Thus, the maximum variation in float height for the maximum expected slurry density variation is about 0.5 cm (0.2 inch), which is well within the maximum allowable slurry level variation $\Delta$ of 1.27 cm (0.5 inch).

As was briefly mentioned above, changes in the slurry level 12 are detected by the float assembly 28 and sensor assembly 34, which senses the relative position of the reference member 30 with respect to the sensor assembly 34. Sensor assembly 34 may comprise any of a wide variety of non-contact position sensors, such as ultrasonic sensors or laser sensors, suitable for sensing the position of the reference member 30 with respect to the sensor assembly 34 and producing an output signal related thereto. In one preferred embodiment, the position sensor assembly 34 comprises an ultrasonic position sensor manufactured by Milltronics, Ltd. of 709 Stadium Drive East, Arlington, Tex. 76011 and sold under the name "The Probe" Level Monitor, model number PL-396.

The electronic proportional-integral-derivative (PID) controller assembly 36 monitors an output signal from the sensor assembly 34 and generates an output signal which is converted into a pressure signal by the current to pressure (IP) transducer 38 which in turn activates the dart actuator 40 as necessary to raise or lower the dart 42, thus control the discharge rate of the tailing 44. The PID controller assembly 36 may generate an output signal based on either the instantaneous position of the reference member 30, or on the first or second time derivatives of the instantaneous position. Whether the instantaneous position or the first and second time derivatives thereof are used by the PID controller assembly 36 to generate the output signal depends largely on the particular system response that is desired. For example, in some cases the desired level of control of the slurry level 12 may be possible based only on data relating to the instantaneous position of the float. In other cases, however, it may be necessary to base the output signal of the PID controller assembly 36 on not only the instantaneous position of the float assembly as measured by the sensor assembly 34, but also on the first or second time derivative of the position signal. In any event, whether it is desired or necessary to use just the position data or various time derivatives thereof would be obvious to persons having ordinary skill in the art after considering the teachings of this invention, the particular response characteristics of the sensor assembly 34, the pressure controller 38, the dart actuator 40, and the float cell assembly 14, as well as well-known system theory. Consequently, the present invention should not be regarded as limited to any one particular control system design. By way of example, however, the particular PID controller assembly 36 used in one preferred embodiment comprises an electronic PID controller manufactured by Moore Products Company of Spring House, Pa. and sold as a "Field-Mounted Controller," model number 348.

The current to pressure transducer 38 may be any of a wide range of devices which accept an electrical input signal from the electronic PID controller 36 and produce a proportional pneumatic output, using regulated instrument air, to operate the dart actuator 40. In one preferred embodiment, the pressure controller 38 comprises a Model 3311 Current to Pressure Transducer manufactured by Fisher-Rosemount of 12001 Technology Drive, Eden Prairie, Minn. 55344. The dart actuator 40 may comprise a Type 01 "Air-O-Matic Actuator" manufactured by Honeywell Process Control Division, 1100 Virginia Drive, Fort Washington, Pa. 19034.

Figure 7:
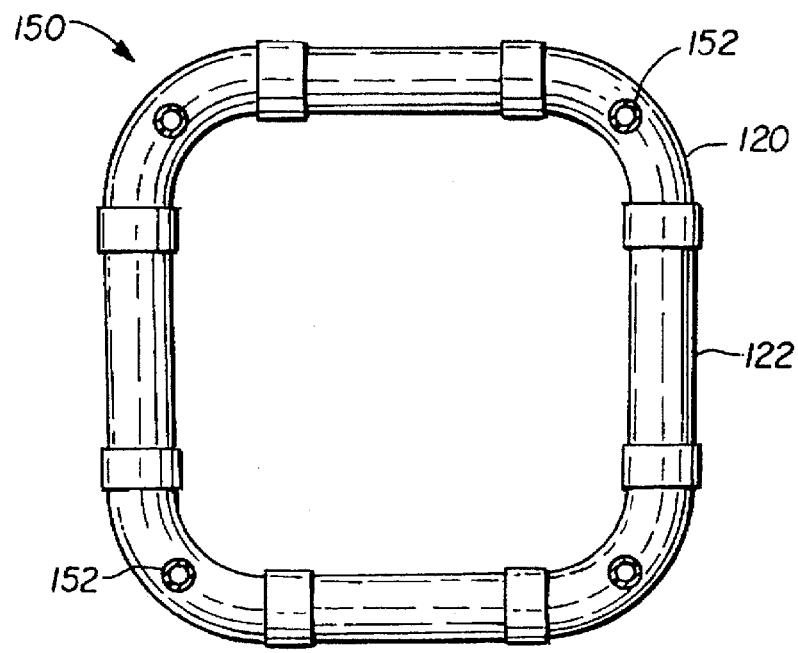
FIG. 7 is a plan view of a second embodiment of the float assembly according to the present invention.

Another embodiment of a float 150 that can be used with the present invention is shown in FIG. 7 and may comprise a plurality of common ABS plastic pipe and tube sections cemented together generally in the shape of a square or rectangle. More specifically, float 150 may comprise four (4) 90° "elbow" sections 120 connected together by short lengths of straight pipe 122. The vertical support members 152 for supporting a reference member (not shown) may be secured to the elbow sections 120. In the embodiment shown in FIG. 7, the 90° elbow sections 120 comprise conventional schedule 40 ABS pipe long-sweep elbows for receiving 2" OD pipe, while the straight pipe sections 122 comprise 2" OD schedule 40 ABS pipe 5⅜" long. The vertical support members 152 comprise ½ OD class 125 PVC pipe having lengths of 23 cm (9 inches) and are attached to the long-sweep ABS elbows 120 by gluing the vertical support members 152 into 13/16" holes in each elbow 120. As was the case for the first embodiment 10, the reference member (not shown) may comprise an acrylic plate having a thickness of about 3/32" and a diameter of about 14½".

Figure 8:
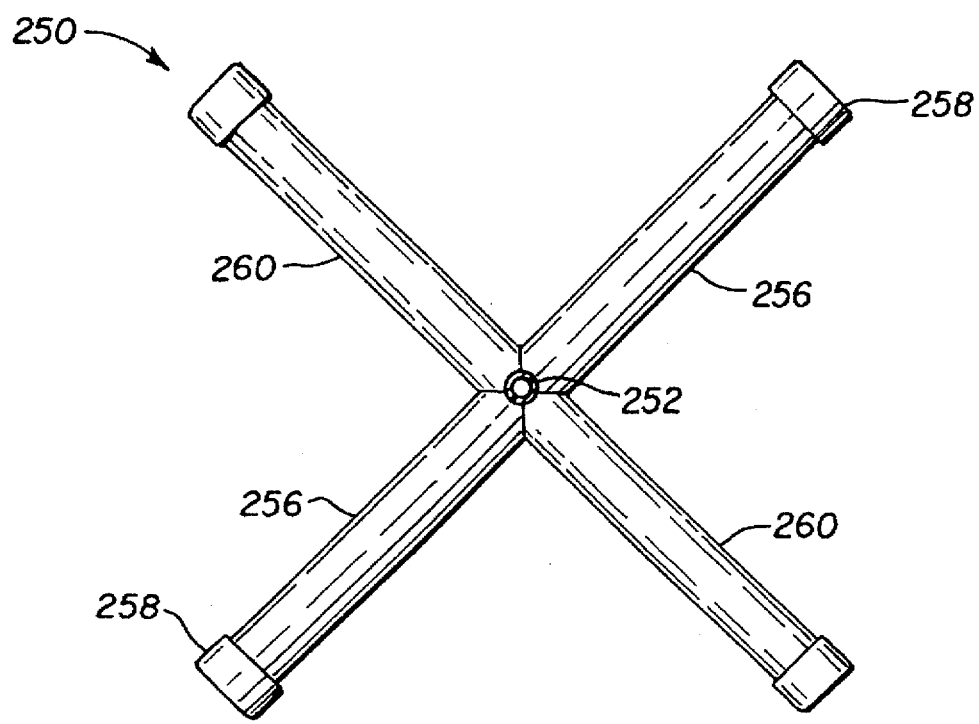
FIG. 8 is a plan view of a third embodiment of the float assembly according to the present invention.

A third embodiment 250 is shown in FIG. 8 and may comprise a float 250 generally in the shape of an "X" and made from a single section 256 of ABS pipe having two leg sections 260 attached thereto substantially at the midpoint of section 256. The ends of each of the pipe sections are closed off by caps 258. The float 250 also includes a single vertical support 252 for supporting a reference member (not shown) above the highest expected level of the froth.

Figure 9:
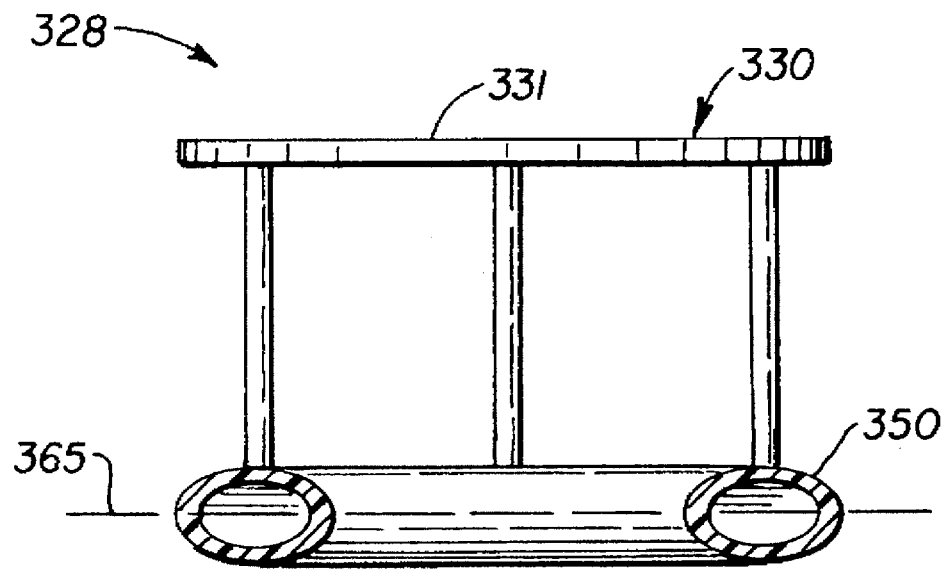
FIG. 9 is a sectional view in elevation of a toroidal shaped float having an elliptical cross-section.
Figure 10:
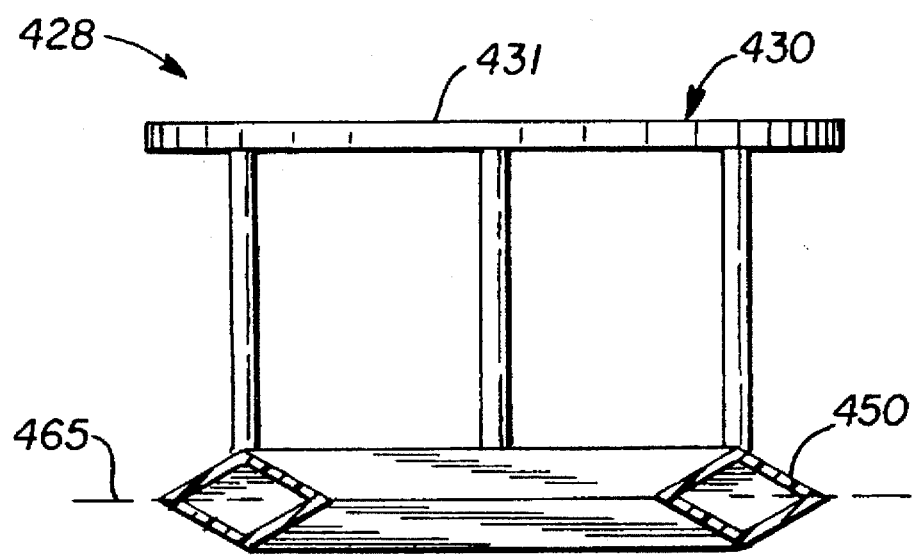
FIG. 10 is a sectional view in elevation of a toroidal shaped float having a cross-section in the shape of a polygon.

This completes the detailed description of the preferred embodiments of the present invention. While a number of specific components were described above for the preferred embodiments of this invention, persons having ordinary skill in the art will readily recognize that other substitute components or combinations of components may be available now or in the future to accomplish comparable functions to the various components shown and described herein. For example, many other float shapes and configurations are possible without departing from the spirit and scope of the invention. That is, besides floats having circular shapes, such as the float 50 shown in FIGS. 4 and 5, floats could be used in the shapes of squares, rectangles, triangles, pentagons, or any other type of closed polygon. It is also not necessary that the floats have circular cross-sections. For example, a fourth embodiment of a float assembly 328 may comprise toroidal shaped float 350 with an elliptical cross-section. The elliptical cross section of float 350 is such that its long axis 365 is oriented horizontally (i.e., parallel to the plane containing the surface 331 of reference member 330), as best seen in FIG. 9. Alternatively, a fourth embodiment of a float assembly 428 may comprise a toroidal shaped float 450 having a cross section in the shape of a polygon or diamond, again with the long axis 465 being substantially horizontal (i.e., parallel to the plane containing the surface 431 of the reference member 430). Similarly, the floats 150 and 250 shown in FIGS. 7 and 8 could also be made from materials having elliptical or diamond-shaped cross-sections, as shown in FIGS. 9 and 10. Indeed, any cross-section that will result in a submergence function such that relatively large changes in submerged volume will result from small changes in submerged depth may be used without departing from the scope of the invention. Actually, the changes in submerged volume with submerged depth need not be necessarily "large." Rather, the float design should be such that a sufficient volume change is produced by small changes in submergence depth. Therefore, it is possible to design a float having an elliptical cross-section with the long axis of the ellipse oriented vertically, so long as submerged volume changes are sufficient to allow for the accurate detection of the slurry level 12.

Still other modifications are possible. For example, while the embodiments shown and described herein utilize a pneumatic dart actuator 40 and a current to pressure (IP) transducer 38, an electrically driven dart actuator could be used just as easily, with the current to pressure (IP) transducer 38 being replaced with a controller suitable for actuating the electrically driven dart actuator.

In sum, then, it is contemplated that the inventive concepts herein described may be variously otherwise embodied and it is intended that the appended claims be construed to include alternative embodiments of the invention except insofar as limited by the prior art.

What is claimed is:

1. A level detector for providing an indication of a level of a liquid, comprising:

a generally circular shaped float defining an open central aperture and having a mass, a volume, a design level of submergence, and a submergence function, wherein the design level of submergence is selected to be at about a point corresponding to a submergence level where a first derivative of the submergence function is a maximum;

a reference member having a mass;

a support member connected to said float and to said reference member for holding said reference member above the liquid; and reference member sensing means operatively associated with said reference member for sensing a position of said reference member and for generating an output signal related to the position of said reference member.

2. The level detector of claim 1, further comprising float cage means surrounding said float for maintaining said float within a zone of detection of said reference member sensing means and wherein the liquid comprises an aerated slurry having a froth on its surface, wherein said float has an effective float density that is equal to the sum of the mass of said float and said reference member divided by the volume of said float, the effective float density being less than a lowest expected density of the aerated slurry and greater than a highest expected density of the froth and wherein said reference member is maintained above the level of the froth.

3. The level detector of claim 2, wherein said reference member comprises a flat member generally parallel to the level of the aerated slurry.

4. The level detector of claim 3, wherein said reference member sensing means comprises a non-contact position sensor attached to said float cage means.

5. The level detector of claim 4, wherein said non-contact position sensor comprises an ultrasonic position sensor.

6. The level detector of claim 4, wherein said non-contact position sensor comprises laser position sensor.

7. The level detector of claim 4, wherein said float comprises a generally toroidal shaped hollow tubular member having a generally circular cross-section.

8. The level detector of claim 4, wherein said float comprises a generally toroidal shaped hollow tubular member having a generally elliptical cross-section.

9. The level detector of claim 4, wherein said float comprises a generally toroidal shaped hollow tubular member having a cross-section generally in the shape of a polygon.

10. A level detector for providing an indication of a level of a liquid, comprising:

a generally X-shaped float having a mass, a volume, a design level of submergence, and a submergence function, wherein the design level of submergence is selected to be at about a point corresponding to a submergence level where a first derivative of the submergence function is a maximum;

a reference member having a mass;

a support member connected to said float and to said reference member for holding said reference member above the liquid; and reference member sensing means operatively associated with said reference member for sensing a position of said reference member and for generating an output signal related to the position of said reference member.

11. A float assembly for floating on the surface of a liquid, comprising:

a generally circular shaped float defining an open central aperture and having a mass, a volume, a design level of submergence, and a submergence function, wherein the design level of submergence is selected to be at about a point corresponding to a submergence level where a first derivative of the submergence function is a maximum;

a reference member having a mass; and a support member connected to said float and to said reference member and extending generally upward from said float for holding said reference member above the liquid.

12. The float assembly of claim 11, wherein the liquid comprises an aerated slurry having a froth on its surface, wherein said float has an effective float density that is equal to the sum of the mass of said float and said reference member divided by the volume of said float, the effective float density being less than a lowest expected density of the aerated slurry and greater than a highest expected density of the froth and wherein said reference member is maintained above the level of the froth.

13. The float assembly of claim 12, wherein said float comprises a generally toroidal shaped hollow tubular member having a generally circular cross-section.

14. The float assembly of claim 12, wherein said float comprises a generally toroidal shaped hollow tubular member having a generally elliptical cross-section.

15. The float assembly of claim 12, wherein said float comprises a generally toroidal shaped hollow tubular member having a cross-section generally in the shape of a polygon.

* * * * *